US008566560B2

(12) United States Patent
Sekhar

(10) Patent No.: US 8,566,560 B2
(45) Date of Patent: Oct. 22, 2013

(54) SYSTEM AND METHOD FOR CONFIGURING STORAGE RESOURCES FOR DATABASE STORAGE

(75) Inventor: Sudhansu Sekhar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 769 days.

(21) Appl. No.: 12/050,978

(22) Filed: Mar. 19, 2008

(65) Prior Publication Data

US 2009/0198945 A1    Aug. 6, 2009

(30) Foreign Application Priority Data

Feb. 1, 2008    (IN) .............................. 292/DEL/2008

(51) Int. Cl.
*G06F 12/00*    (2006.01)

(52) U.S. Cl.
USPC ................. 711/173; 711/5; 711/118; 711/171

(58) Field of Classification Search
USPC ...................................... 711/5, 118, 171, 173
See application file for complete search history.

(56) References Cited

U.S. PATENT DOCUMENTS

| 6,611,903 | B2 | 8/2003 | Fujimoto et al. ............... 711/162 |
| 6,640,278 | B1 | 10/2003 | Nolan et al. ....................... 711/6 |
| 6,671,767 | B2 | 12/2003 | Furuumi et al. ............... 711/100 |
| 6,851,020 | B2 | 2/2005 | Matsumoto et al. .......... 711/112 |
| 6,874,061 | B1 * | 3/2005 | Bridge .......................... 711/114 |
| 7,031,987 | B2 * | 4/2006 | Mukkamalla et al. ................ 1/1 |
| 2007/0028053 | A1 | 2/2007 | Shet et al. ...................... 711/129 |
| 2007/0162514 | A1 * | 7/2007 | Civetta et al. ................. 707/200 |

* cited by examiner

*Primary Examiner* — Reginald Bragdon
*Assistant Examiner* — Gurtej Bansal
(74) *Attorney, Agent, or Firm* — Baker Botts L.L.P.

(57) ABSTRACT

A system and method for configuring storage resources for database storage are disclosed. A method may include mapping at least one first tablespace having a first block size to at least one first logical unit. The method may also include mapping the at least one first tablespace and the at least one first logical unit to a first cache having a size equal to the first block size. In addition, the method may include mapping at least one second tablespace having a second block size to at least one second logical unit. The method may further include mapping the at least one second tablespace and the at least one second logical unit to a second cache having a size equal to the second block size.

13 Claims, 2 Drawing Sheets

| TABLE-SPACE | BLOCK SIZE | LOGICAL UNIT(S) | READ CACHE | WRITE CACHE |
|---|---|---|---|---|
| A | 4 KB | A,B | A | A |
| B | 4 KB | A,B | A | A |
| C | 8 KB | C,D | B | B |
| D | 16 KB | E | C | C |

SYSTEM AND METHOD FOR CONFIGURING STORAGE RESOURCES FOR DATABASE STORAGE

TECHNICAL FIELD

The present disclosure relates in general to storage resource configuration, and more particularly to a system and method for configuration of storage resources for database storage.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use databases. A database may be defined as a structured collection of records or data. The structured collection of records or data making up a database may be stored in an information handling system and/or computer-readable medium accessible to the information handling system so that a computer program (e.g., a database management system or "DBMS") and/or person may query the database to retrieve desired information.

Typically, a database is stored on one or more logical storage units, also known simply as "logical units." Each logical storage unit may be made up of one or more hard disk drives, magnetic tape libraries, optical disk drives, magneto-optical disk drives, compact disk drives, compact disk arrays, disk array controllers, and/or any other type of computer-readable media. In addition, each logical storage unit may have a unique identifier, or logical unit number (LUN) that identifies the logical unit to an information handling system and/or software executing thereupon.

Database software typically allocates memory space and storage space in multiples of database block sizes. For example, a database may be stored in memory and/or persistent storage in one or more blocks of 2 kilobytes (KB), 4 KB, 8 KB, and/or 16 KB. Memory and/or persistent storage may also include caches (e.g., buffers) having sizes equal to the database block size that may improve the speed of reading from and/or writing to memory and/or persistent storage. In certain database systems, a user may be permitted to create logical groupings of data known as "tablespaces" with block sizes different from the standard database block size for the database. Thus, if a small block size is desirable, a user may create a tablespace with block sizes smaller than the standard block size (e.g., for online transaction processing systems that perform random update operations). On the other hand, if a large block size is desirable, a user may create a tablespace with block sizes larger than the standard block size (e.g., for decision support systems that access large numerous consecutive rows of database information at a time a larger cache size may reduce the number of input/output requests needed to store and/or retrieve data). In addition, in mixed applications, a user may employ multiple tablespaces with each with a different block size.

However, because tablespaces may span one or more logical units, and because particular logical unit is typically associated with a particular read cache and/or a particular write cache, the advantages of using read and/or write caches may be diminished in instances where a cache is of a different size than the block size of a tablespace block stored on the logical unit. For example, if a cache is smaller than the block size of a tablespace stored on a logical unit, the cache will not be able to read or store an entire block of data. On the other hand, if a cache is larger than the block size of a tablespace stored on a logical unit, a portion of the cache may be unused when reading or storing a block of data.

Accordingly, a need has arisen for systems and methods that allow for more efficient configuration of storage resources for database storage.

SUMMARY

In accordance with the teachings of the present disclosure, disadvantages and problems associated with configuring storage resources for database storage may be substantially reduced or eliminated.

In accordance with one embodiment of the present disclosure, a method for configuring a system for database storage is provided. The method may include mapping at least one first tablespace having a first block size to at least one first logical unit. The method may also include mapping the at least one first tablespace and the at least one first logical unit to a first cache having a size equal to the first block size. In addition, the method may include mapping at least one second tablespace having a second block size to at least one second logical unit. The method may further include mapping the at least one second tablespace and the at least one second logical unit to a second cache having a size equal to the second block size.

In accordance with another embodiment of the present disclosure, a program of instructions embodied in a computer-readable medium may be configured to, when executed, map at least one first tablespace having a first block size to at least one first logical unit. The program of instructions may also be configured to map the at least one first tablespace and the at least one first logical unit to a first cache having a size equal to the first block size. In addition, the program of instructions may be configured to map at least one second tablespace having a second block size to at least one second logical unit. The program of instructions may further be configured to map the at least one second tablespace and the at least one second logical unit to a second cache having a size equal to the second block size.

In accordance with a further embodiment of the present disclosure, a system for storing a database may include a processor, a first logical unit communicatively coupled to the processor, a second logical unit communicatively coupled to the processor, a first cache communicatively coupled to the processor and having a first size, and a second cache communicatively coupled to the processor and having a second size. The first logical unit may be mapped to the first cache and may be configured to store tablespaces with a block size equal to the first size. The second logical unit may be mapped to the second cache and may be configured to store tablespaces with a block size equal to the second size.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figures 1, 3:
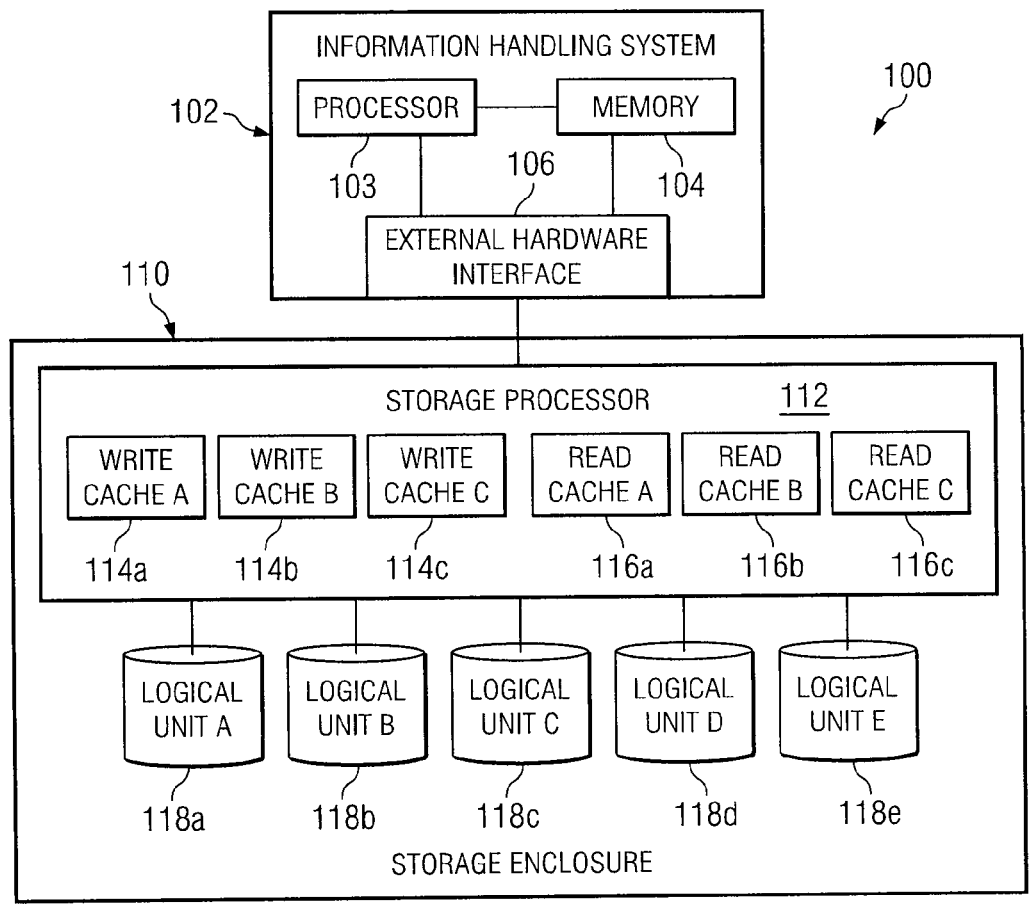
FIG. 1 illustrates a block diagram of an example system for database storage, in accordance with an embodiment of the present disclosure.
FIG. 3 illustrates a table depicting an example mapping of database tablespaces to logical units and caches, in accordance with an embodiment of the present disclosure.
Figure 2:
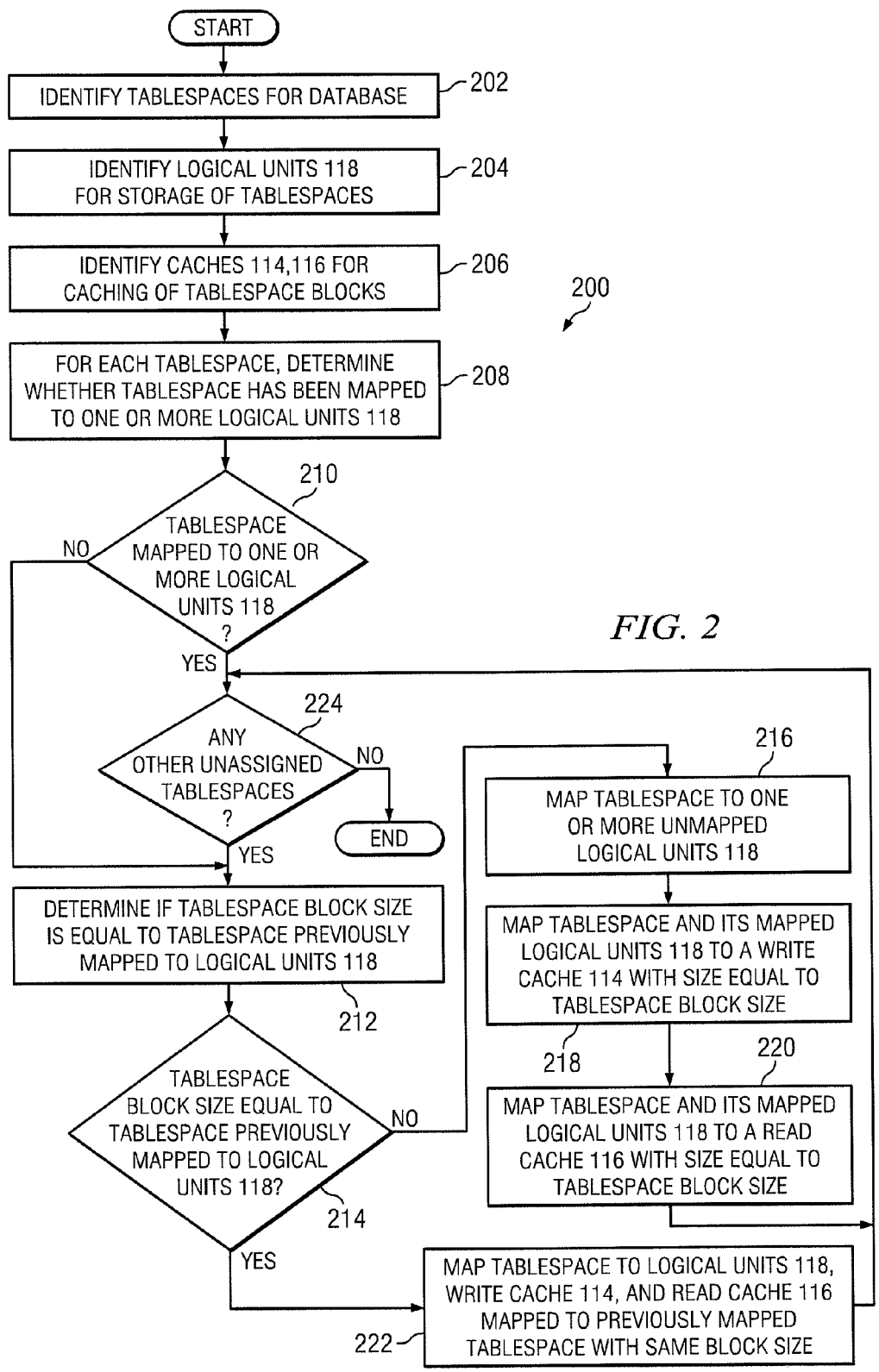
FIG. 2 illustrates a flow chart of a example method for assigning database tablespaces to logical units and caches, in accordance with an embodiment of the present disclosure.

Preferred embodiments and their advantages are best understood by reference to FIGS. 1-3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 for database storage, in accordance with an embodiment of the present disclosure. As depicted, system 100 may include an information handling system 102 and a storage enclosure 110.

Information handling system 102 may generally be operable to receive data from and/or communicate data to storage enclosure 110, one or more other information handling systems, and/or other devices communicatively coupled to information handling system 102. In certain embodiments, information handling system 102 may be a server. In another embodiment, information handling system 102 may be personal computer. As shown in FIG. 1, information handling system 102 may include a processor 103, a memory 104 communicatively coupled to processor 103, and an external hardware interface 106.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, logical units 118 of storage enclosure 110, and/or another component of system 100.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

External hardware interface 106 may include any suitable system, apparatus, or device operable to serve as an interface between information handling system 102 and an external hardware device (e.g., storage enclosure 110). In certain embodiments, external hardware interface 106 may allow storage enclosure 110 and/or other external hardware devices to be directly coupled and/or locally attached to information handling system (e.g., by means of a universal serial bus port, traditional serial port, parallel port, or other suitable port. In the same or alternative embodiments, external hardware interface 106 may include a network interface allowing allow storage enclosure 110 and/or other external hardware devices to be coupled to information handling system 102 via a network.

In operation, external hardware interface 106 may enable information handling system 102 to communicate to storage enclosure 110 and/or other external hardware devices using any suitable transmission protocol (e.g., TCP/IP) and/or communication standard (e.g., SCSI, FibreChannel, IEEE 802.11, Wi-Fi). In certain embodiments, external hardware interface 106 may include a network interface card (NIC). In the same or alternative embodiments, external hardware interface 106 may be configured to communicate with storage enclosure and/or other external hardware devices via wireless transmissions. In the same or alternative embodiments, external hardware interface 106 may provide physical access to a networking medium and/or provide a low-level addressing system (e.g., through the use of Media Access Control addresses).

Storage enclosure 110 may be configured to hold and power storage resources and/or other components. As shown in FIG. 1, storage enclosure 110 may include a storage processor 112 and logical units 118a-e (which may be referred to individually or collectively herein as logical unit 118 and/or logical units 118). Each logical unit 118 may include all and/or a portion of one or more physical storage resources (e.g., hard disk drives, magnetic tape libraries, optical disk drives, magneto-optical disk drives, compact disk drives, compact disk arrays, disk array controllers, other computer-readable media, and/or any other systems, apparatuses or devices operable to store data) and may appear to an operating system executing on information handling system 102 as a single storage unit. During operation, storage enclosure 110 may be communicatively coupled to information handling system 102 to facilitate communication of data between information handling system 102 and logical units 118. Although FIG. 1 depicts storage enclosure 110 having five logical units 118, storage enclosure 110 may include any number of logical units 118. In addition, although FIG. 1 depicts system 100 as having only one storage enclosure 110, logical units 118 may be disposed in any number of storage enclosures 110.

Storage processor 112 may comprise any system, device, or apparatus operable to interpret and/or execute instructions (e.g., READ and/or WRITE requests) and/or process data (e.g., data to be read from storage enclosure 110 and/or data to be written to storage enclosure 110) and may include, without limitation, a microprocessor, microcontroller, digital signal processor (DSP), application specific integrated circuit (ASIC), or any other digital or analog circuitry configured to interpret and/or execute program instructions and/or process data. As shown in FIG. 1, storage processor 112 may include one or more write caches 114a-c (which may be referred to individually or collectively herein as write cache 114 and/or write caches 114) and/or one or more read caches 116a-c (which may be referred to individually or collectively herein as read cache 116 and/or read caches 116).

Each write cache 114 may comprise any computer-readable medium (e.g., a memory) communicatively coupled to one or more logical units 118. In operation, write caches 114 may be used to speed up and/or increase the efficiency of writing data to one or more of logical units 118. For example, when data from information handling system 102 is to be written to a logical unit 118, rather than immediately store the data onto a logical unit's non-volatile storage (e.g., hard disk drives), storage processor 112 may instead store the data in a write cache 114 and signal to information handling system 102 that the data has been successfully stored. This may significantly speed up the acknowledgment back to information handling system 102 that the data has been successfully stored, allowing information handling system 102 to proceed to other tasks. Then, when it is convenient to storage processor 112, the data in the designated write cache 114 may be flushed to the non-volatile storage area of a logical unit 118, where it becomes "permanently" stored.

Each read cache 116 may comprise any computer-readable medium (e.g., a memory) communicatively coupled to one or more logical units 118. In operation, read caches 116 may be used to speed up and/or increase the efficiency of reading data from one or more of logical units 118. For example, in many database applications, a block of data accessed from persistent storage is often again needed a relatively short time later. By storing such block in a cache that can be accessed faster than persistent storage, the latency associated with reading the data block may be decreased.

Although FIG. 1 depicts that storage enclosure 110 includes three write caches 114 and three read caches 116, storage enclosure 110 may include any number of write caches and/or read caches. In addition, although FIG. 1 depicts write caches 114 and read caches 116 residing on storage processor 112, write caches 114 and/or read caches 116 may reside any suitable place and/or location within system 100.

As mentioned above, certain database systems allow a user to create logical groupings of data known as "tablespaces" with block sizes different from the standard database block size for the database. Also as mentioned above, because tablespaces may span one or more logical units, and because particular logical unit is typically associated with a particular read cache and/or a particular write cache, the advantages of using read and/or write caches may be diminished in instances where a cache is of a different size than the block size of a tablespace block stored on the logical unit. For example, if a cache is smaller than the block size of a tablespace stored on a logical unit, the cache will not be able to read or store an entire block of data. On the other hand, if a cache is larger than the block size of a tablespace stored on a logical unit, a portion of the cache may be unused when reading or storing a block of data. Such disadvantages may be overcome by mapping tablespaces having the same block sizes to specific logical units 118 and caches 114, 116 and assuring that tablespaces with unequal block sizes are not mapped to the same specific logical units 118, as set forth in greater detail with respect to FIGS. 2 and 3 below.

FIG. 2 illustrates a flow chart of an example method 200 for assigning database tablespaces to logical units 118 and caches 114, 116, in accordance with an embodiment of the present disclosure. According to one embodiment, method 200 preferably begins at step 202. As noted above, teachings of the present disclosure may be implemented in a variety of configurations of system 100. As such, the preferred initialization point for method 200 and the order of the steps 202-224 comprising method 200 may depend on the implementation chosen.

At step 202, information handling system 102, storage processor 112, and/or another component of system 100 may identify the tablespaces of a database to be stored on logical units 118. At step 204, information handling system 102, storage processor 112, and/or another component of system 100 may identify the logical units 118 for storage of the tablespaces. At step 206, information handling system 102, storage processor 112, and/or another component of system 100 may identify caches 114, 116 associated with logical units 118.

At step 208, for each tablespace, information handling system 102, storage processor 112, and/or another component of system 100 may determine whether the tablespace has been mapped and/or assigned to one of more of logical units 118. If at step 210, it is determined that the tablespace has not already been mapped to one or more logical units 118, method 200 may proceed to step 212. Otherwise, if at step 210, it is determined that the tablespace has already been mapped to one or more logical units 118, method 200 may proceed to step 224.

At step 212, for each particular tablespace, information handling system 102, storage processor 112, and/or another component of system 100 may determine whether the block size for the particular tablespace is equal to a tablespace previously mapped to one or more logical units 118. If at step 214, it is determined that the block size of the particular tablespace is not equal to the block size of a previously-mapped tablespace, method 200 may proceed to step 216. Otherwise, if at step 214, it is determined that the block size of the particular tablespace is equal to the block size of a previously-mapped tablespace, method 200 may proceed to step 222.

At step 216, the particular tablespace may be mapped to one or more previously-unmapped logical units 118. At step 218, the particular tablespace and the logical units 118 to which it is mapped may be mapped to a write cache 114 with size equal to the tablespace block size. At step 220, the particular tablespace and the logical units 118 to which it is mapped may be mapped to a read cache 116 with size equal to the tablespace block size. After completion of step 220, method 200 may proceed to step 224.

At step 222, in response to a determination that the block size of the particular tablespace is equal to the block size of a previously-mapped tablespace, the particular tablespace may be mapped to the logical units 118, write cache 114, and read cache 116 that were mapped to the previously-mapped tablespace with the same block size.

At step 224, a determination may be made regarding whether any other unmapped or unassigned tablespaces remain. If unmapped tablespaces remain, method 200 may proceed again to step 212. Otherwise, if unmapped tablespaces do not remain, method 200 may end.

Information regarding the mappings made in method 200 may be stored on any suitable computer-readable medium, including without limitation memory 104, storage processor 112, and/or one or more of logical units 118.

Although FIG. 2 discloses a particular number of steps to be taken with respect to method 200, it is understood that method 200 may be executed with greater or lesser steps than those depicted in FIG. 2. In addition, although FIG. 2 discloses a certain order of steps to be taken with respect to method 200, the steps comprising method 200 may be completed in any suitable order. For example, in certain embodiments, steps 202, 204, and 206 may be executed in any order, or substantially contemporaneous to each other.

Method 200 may be implemented using system 100 or any other system operable to implement method 200. In certain embodiments, method 200 may be implemented partially or fully in software embodied in tangible computer-readable media.

After the mapping discussed above is established, data from each tablespace may be written to the caches 114, 116 and logical units 118 to which it is mapped.

FIG. 3 illustrates a table depicting an example mapping of database tablespaces to logical units 118 and caches 114, 116, in accordance with an embodiment of the present disclosure. In particular, FIG. 3 depicts an example mapping of system 100 in which a database includes four tablespaces A, B, C, and D, that have block sizes of 4 KB, 4 KB, 8 KB and 16 KB respectively, write cache 114a and read cache 116a have a cache size of 4 KB, write cache 114b and read cache 116b have a cache size of 8 KB, and write cache 114c and read cache 116c have a cache size of 16 KB. Using a method similar or identical to method 200, tablespaces A and B with block size 4 KB may be mapped to 4 KB caches 114a and 116a and logical units 118a and 118b. In addition, tablespace C with block size 8 KB may be mapped to 8 KB caches 114b and 116b and logical units 118c and 118d. Also, tablespace D with block size 16 KB may be mapped to 16 KB caches 114c and 116c and logical unit 118e. Accordingly, tablespaces having the same block sizes are mapped to the same specific logical units 118 and caches 114, 116, and tablespaces with unequal block sizes are not mapped to the same specific logical units 118. Thus, each tablespace may be written to one or more logical units 118 with an associated write cache 114 and/or read cache 116 of a size equal to tablespace blocks.

Although the present disclosure has been described in detail, it should be understood that various changes, substitutions, and alterations can be made hereto without departing from the spirit and the scope of the invention as defined by the appended claims.

What is claimed is:

1. A method for configuring a storage system for database storage comprising:
   receiving, from an information handling system physically distinct from the storage system, an identity of at least one first tablespace and at least one second tablespace to be stored on the storage system, wherein the at least one first tablespace has a first block size and the at least one second tablespace has a second block size;
   mapping, by a processor of the storage system the at least one first tablespace to at least one first logical unit, wherein the at least one first logical unit comprises all or a portion of at least one physical storage resource of the storage system and is configured to appear to an operating system executing on the information handling system as a single storage device;
   mapping, by the processor, the at least one first tablespace and the at least one first logical unit to a first storage cache of the storage system, the first storage cache having a size equal to the first block size;
   mapping, by at least one second tablespace to at least one second logical unit, wherein the at least one second logical unit comprises all or a portion of at least one physical storage resource of the storage system and is configured to appear to an operating system executing on information handling system as a single storage device; and
   mapping, by the at least one second tablespace and the at least one second logical unit to a second storage cache of the storage system, the second storage cache having a size equal to the second block size.

2. A method according to claim 1, further comprising:
   writing, by the processor, data of the at least one first tablespace to the at least one first logical unit and the first storage cache; and
   writing, by the processor, data of the at least one second tablespace to the at least one second logical unit and the second storage cache.

3. A method according to claim 1, wherein at least one of mapping the at least one first tablespace to the first logical unit and mapping the at least one second tablespace to the second logical unit comprises:
   in response to determining that the size of the tablespace is equal to the block size of a previously-mapped tablespace, mapping, by the processor, the tablespace to at least one logical unit mapped to the previously-mapped tablespace; and
   in response to determining that the size of the tablespace is not equal to the block size of a previously-mapped tablespace, mapping, by the processor, the tablespace to at least one previously-unmapped logical unit.

4. A method according to claim 1, wherein the first storage cache comprises at least one of a read cache and a write cache.

5. A method according to claim 1, wherein the second storage cache comprises at least one of a read cache and a write cache.

6. A program of instructions embodied in a non-transitory computer-readable medium, the program of instructions configured to, when executed by a processor of a storage system, perform operations comprising:
   receiving, from an information handling system physically district from the storage system, an identity of at least one first tablespace and at least one second tablespace to be stored on the storage system, wherein the at least one first tablespace has a first block size and the at least one second tablespace has a second block size;

map the at least one first tablespace to at least one first logical unit, wherein the at least one first logical unit comprises all or a portion of at least one physical storage resource of the storage system and is configured to appear to an operating system executing on an information handling system as a single storage device;

map the at least one first tablespace and the at least one first logical unit to a first storage cache of the storage system, the first storage cache having a size equal to the first block size;

map the at least one second tablespace to at least one second logical unit, wherein the at least one second logical unit comprises all or a portion of at least one physical storage resource of the storage system and is configured to appear to an operating system executing on an information handling system as a single storage device; and map the at least one second tablespace and the at least one second logical unit to a second storage cache of the storage system, the second storage cache having a size equal to the second block size.

7. A program of instructions according to claim 6, further configured to, when executed by the processor:

write data of the at least one first tablespace to the at least one first logical unit and the first storage cache; and write data of the at least one second tablespace to the at least one second logical unit and the second storage cache.

8. A program of instructions according to claim 6, wherein at least one of mapping the first tablespace to the first logical unit and mapping the second tablespace to the second logical unit comprises:

in response to determining that the size of the tablespace is equal to the block size of a previously-mapped tablespace, mapping, by the processor, the tablespace to at least one logical unit mapped to the previously-mapped tablespace; and in response to determining that the size of the tablespace is not equal to the block size of a previously-mapped tablespace, mapping, by the processor, the tablespace to at least one previously-unmapped logical unit.

9. A program of instructions according to claim 6, wherein the first storage cache comprises at least one of a read cache and a write cache.

10. A program of instructions according to claim 6, wherein the second storage cache comprises at least one of a read cache and a write cache.

11. A storage system for storing a database, comprising:

a plurality of physical storage resources, comprising:

a first logical unit comprising all or a portion of at least one physical storage resource of the plurality of storage resources, the first logical unit configured to appear to an operating system executing on an information handling system as a single storage device;

a second logical unit comprising all or a portion of at least one physical storage resource of the plurality of storage resources, the second logical unit configured to appear to an operating system executing on the information handling system as a single storage device;

a processor communicatively coupled to the plurality of physical storage resources, the processor including a first storage cache having a first size and a second storage cache having a second size, the processor configured to:

receive from the information handling system an identity of at least one first tablespace and at least one second tablespace to be stored on the storage system, wherein the information handling system is physically distinct from the storage system;

map the at least one first tablespace the first logical unit, the at least one first tablespace having a first block size;

map the at least one first tablespace and the first logical unit to the first storage cache, wherein the first storage cache is configured to store tablespaces with a block size equal to the first size;

map the at least one second tablespace the second logical unit, the at least one second tablespace having a second block size; and map the at least one second tablespace and the second logical unit to the second storage cache, the second storage cache being is configured to store tablespaces with a block size equal to the second size.

12. A system according to claim 11, wherein the at least one first storage cache comprises at least one of a read cache and a write cache.

13. A system according to claim 11, wherein the at least one second storage cache comprises at least one of a read cache and a write cache.

* * * * *